F. D. SAMPSON.
Straw Cutter.

No. 4,956.

Patented Feb. 5, 1847.

UNITED STATES PATENT OFFICE.

FREDERICK D. SAMPSON, OF EAST BROOKFIELD, MASSACHUSETTS.

STRAW-CUTTER.

Specification of Letters Patent No. 4,956, dated February 5, 1847.

*To all whom it may concern:*

Be it known that I, FREDERICK D. SAMPSON, of East Brookfield, in the county of Worcester and State of Massachusetts, have invented a new and useful Improvement in Knives of Machinery for Cutting Straw, generally termed "Straw-Cutters;" and I do hereby declare that the nature of the same is fully described and represented in the following description and accompanying drawings, letters, figures, and references thereof.

Figure 1:
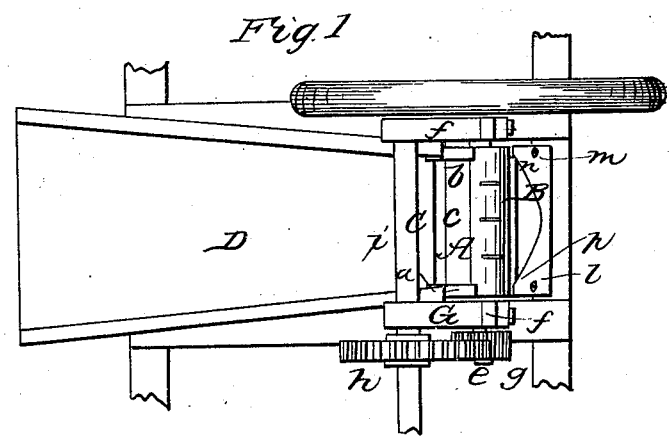
Figure 2:
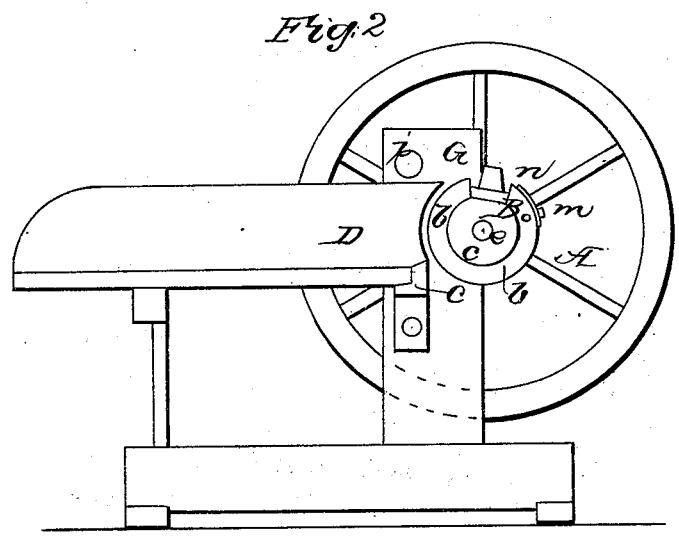

Of said drawings Figure 1, exhibits a top view of a straw cutting machine having my improvement applied to it. Fig. 2 is a central vertical and longitudinal section of it.

In said figures A denotes the cylinder which carries the cutting knife, or knives. B is the cutting knife.

C is a transverse metallic bar, against which the cutting knife runs, and over and upon which, the straw or other material to be cut is made to pass from the trough D. The said bar constitutes what may be considered, in some respects as a knife, for its front and upper edge is beveled down, so as to make an acute angle of about forty five degrees, with its front face or edge, or that next adjacent to the cylinder A. The angular cutting bar should have its upper edge raised above the bottom of the trough as seen in Fig. 2. The said bar extends entirely across the trough and should be as long as the cutting knife upon the cylinder.

The cylinder A is composed of two circular heads $a$, $b$, (both being of the same diameter) united to a cylinder $c$ of lesser diameter—the whole being mounted and fixed upon a horizontal shaft $e$ properly sustained so as to revolve in bearings $f$ $f$ applied to the frame G the said cylinder A being arranged with respect to the feeding trough as seen in the drawings.

$g$ is a toothed pinion placed and fixed upon or near one end of the shaft $e$. It engages with and is revolved by a gear wheel $h$ fixed upon a horizontal crank shaft $i$ disposed as seen in the drawings. The said shaft $i$ may be put in motion (so as to impart motion to the cylinder A) by power applied to a crank upon it, or in any other way.

The cutting knife B is secured to the circular heads $a$, $b$, by screws $l$ $m$ or other proper equivalents. The said knife is made in a very peculiar manner. It consists of a plate of steel or other suitable material, curved transversely, into the arc of a circle corresponding with the curve of the outer peripheries of the circular heads $a$ $b$. After being so curved the said plate has a reëntering angular notch $n$, $o$, $p$, cut out of one edge of it and from the two ends toward the central part of it as seen in Fig. 1. The lower edges of the said angular space are ground sharp so as to form two cutting knives. When said knife edges are revolved or made to move, when the cylinder A is revolved they act in concert with the angular knife bar C and diagonally to its edge after the manner of shears, and toward its center. The material to be cut is moved over and beyond the edge of the knife bar C, and as the knife passes by the bar, it cuts diagonally in two directions through the mass.

The pressure of the knife upon the straw in the act of cutting through it, forces it down upon the angular or knife bar C to such a degree, as to press the bar into the mass, and hold it firmly, and prevent it from advancing while the cutting knife is passing through it, and in such a curved or inclined manner as to tend greatly to draw it forward. By employing the angular knife bar, I an enabled to depress the bottom of the feeding trough nearly to a level with the lower part of the cylinder A and by so doing cause the cutting knives to pass through the mass of straw in a path inclined to the axes of the several straws, thus cutting through them in a much easier manner than if the knife was to act in path or plane perpendicular to the axis of each straw. By means of the angular position of the blades $n$, $o$, $o$ $p$ or edges of the notch $n$, $o$, $p$, the straws are all forced toward each other in the act of cutting them and as the edges $n$ $o$, $o$ $p$, descend through them, they each cut them with what is termed a drawing stroke, so that it will be seen that the said blades, not only cut with drawing strokes, but also in paths, inclined to the axes of the straws. This double action severs the straws with great ease, and requires very little power to operate the machine, in comparison to that usually consumed in running other kinds of straw cutters.

I therefore claim as my invention—

A rentering angular transversal curved knife (B) and an elevated angular knife bar (C) in combination with each other and constructed and arranged with respect to the feeding trough, and operating together substantially in the manner and for the puspose as above specified.

In testimony whereof, I have hereto set my signature this ninth day of July A. D. 1846.

FREDERICK D. SAMPSON.

Witnesses:
 EDWARD BLISS,
 MARY ANN BLISS.